Patented June 28, 1932

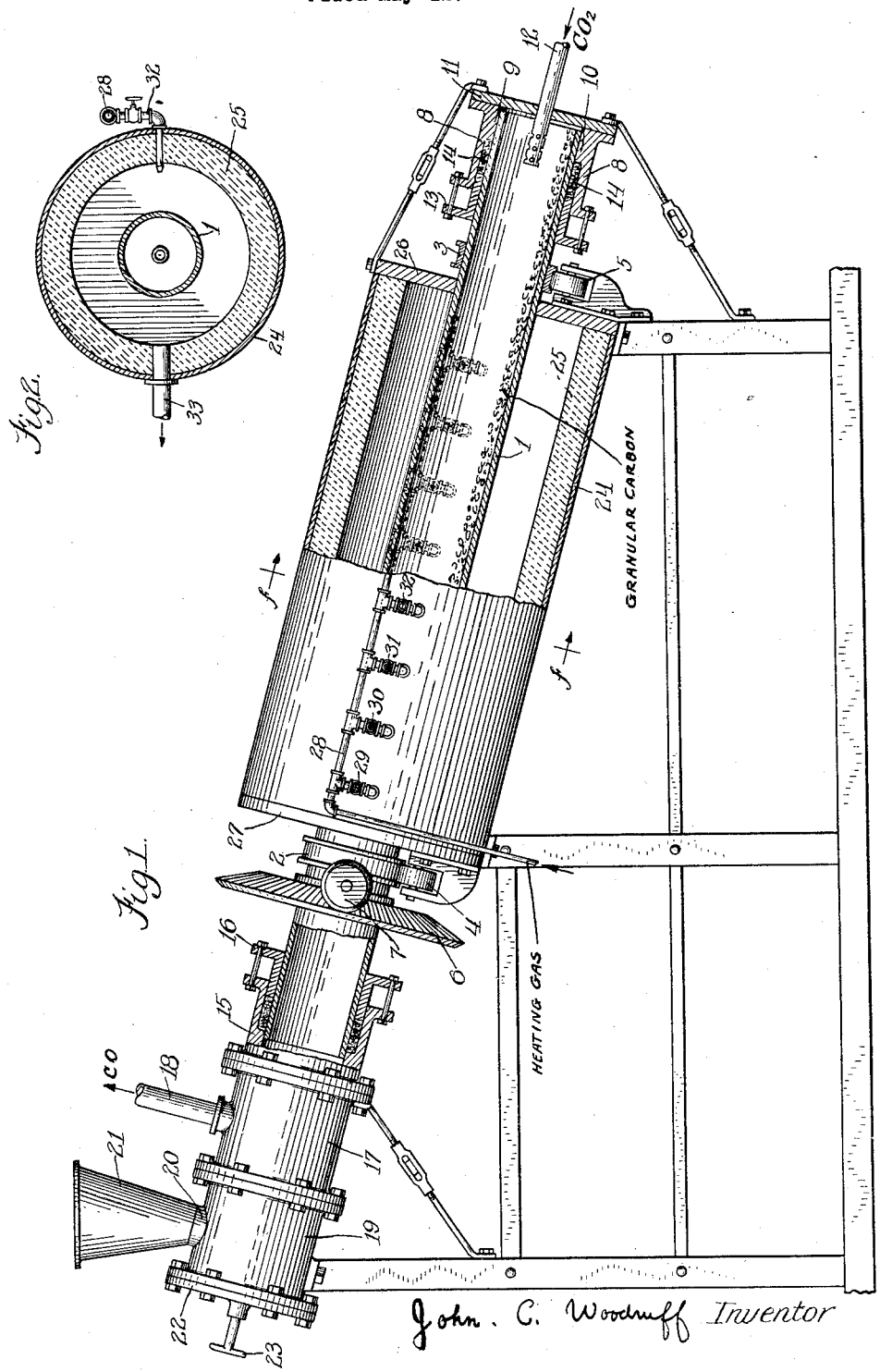

1,865,053

UNITED STATES PATENT OFFICE

JOHN C. WOODRUFF, OF TERRE HAUTE, INDIANA, ASSIGNOR TO COMMERCIAL SOLVENTS CORPORATION, OF TERRE HAUTE, INDIANA, A CORPORATION OF MARYLAND

CARBON MONOXIDE PROCESS

Application filed May 12, 1927. Serial No. 190,791.

My invention relates to the production of carbon monoxide by the interaction of carbon with carbon dioxide at elevated temperatures, according to the reaction expressed by the equation:—

$$C + CO_2 = 2CO$$

While the reaction thus described has been known for years and may be readily performed on a laboratory scale, various difficulties have arisen that have made the economical production of carbon monoxide by this method most difficult. One of the principal difficulties encountered has been the maintenance of an even degree of heat in the reacting carbon. It has also been practically impossible to produce carbon monoxide free from substantial quantities of carbon dioxide, nitrogen, and hydrogen.

The forms of pure carbon most readily adapted to use in the reaction are charcoal and coke. Both of these materials are poor conductors of heat. In past attempts to produce carbon monoxide from carbon and carbon dioxide, an ordinary tower, such as is employed for the manufacture of water gas has been used, and carbon dioxide gas has been passed through heated carbon to produce a gas containing carbon monoxide. This sort of process will not produce pure carbon monoxide economically on account of the impossibility of maintaining an even temperature throughout the solid carbon. The optimum temperature for the reaction depends somewhat on the raw material employed. For charcoal the best temperature is 1100° C.; for coke, 1300° C.; and for anthracite coal, 1200° C.;—98% carbon monoxide being produced in each case. However, at any temperature above 800° C. and below 1500° C. the reaction operates satisfactorily. For example, when wood charcoal is employed, at 850° C. a gas containing 50% carbon monoxide is produced if adequate contact between the carbon and carbon dioxide is allowed.

In cases where it was attempted to heat the solid carbon by the external application of heat through the walls of the tower or similar containing vessel, it was found to be impossible to secure an even degree of heat throughout the cross-section. The interior of the carbon core could not be raised to the optimum temperature without overheating the portions adjacent to the heated wall. On the other hand, if the amount of heat was diminished so that only the outside portion of the carbon was raised to the optimum temperature, the reaction took place only at these points with two undesirable results:—first, the carbon dioxide passing through the central cool portion of the carbon was practically unchanged so that the effluent gas contained large quantities of carbon dioxide; and second, the carbon in the optimum temperature range was consumed by the carbon monoxide reaction so that "channeling" of the solid carbon bed occurred, due to the removal of the particles on the periphery. As soon as channeling occurred, large quantities of carbon dioxide passed through the apparatus unchanged.

In other cases, the necessary degree of heat was supplied by the combustion of part of the carbon in the ordinary manner employed in water gas manufacture, air being passed through the burning carbon until it had reached incandescence, after which a stream of carbon dioxide was passed through to produce carbon monoxide. This method has several disadvantages. It is wasteful of carbon, it is capable only of alternate operation, close temperature control cannot be achieved, and the resultant product is contaminated with other gases.

The purpose of the present invention is to provide a process and apparatus of improved design, whereby substantially perfect temperature control is assured, continuous operation is possible, channeling is avoided, and the resultant product consists of substantially pure carbon monoxide.

My process can best be understood by reference to the accompanying drawing which illustrates the type of apparatus in which it may be practiced.

In Figure 1 is presented a cutaway elevation of the apparatus, all of the principal parts being shown in cross-section. Figure 2 represents a cross-section of the converter taken on the line f—f. Identical numbers are used for the parts in the two figures.

The apparatus is provided with a large corrosion-resistant tube (1), preferably of nichrome. This tube is equipped with pulley grooves (2) and (3) which are supported on rollers (4) and (5) so that the tube may rotate freely on its axis. In addition to supporting the tube and allowing it to rotate, rollers (4) and (5) also serve to take up the sideward thrust caused by the tilted position of the tube. Near the upper end of the tube (1) is attached an actuating gear (6) driven by its member (7). This arrangement provides means for causing the tube (1) to revolve on its axis at a relatively slow rate, (for example, 3 R. P. M.). While bevel gears are indicated on the drawing, any suitable driving connection may be employed.

The lower end of tube (1) travels loosely in stuffing box (8) which is similar to an ordinary flange section except for the shoulders (9) and (10) later discussed. The stuffing box (8) is closed with plate (11) through which penetrates gas supply pipe (12). In the annular space between the tube (1) and the stuffing box (8) there is placed a loose sleeve (13) which is bolt-connected to stuffing box (8). By tightening these bolts, the sleeve (13) is forced down against the packing (14) and the stuffing box is thus kept tight. The packing may well consist of a graphite-asbestos mixture. The shoulders (9) and (10) of the stuffing box (8) take up the thrust of the packing.

At the upper end of the tube (1) there is another similar stuffing box (15), bolt-connected to a sleeve (16). The free end of stuffing box (15) is bolted to another pipe section (17) containing a T (18) through which the carbon monoxide gas generated in the tube (1) may escape. The section (17) is affixed to end section (19) which also includes a T joint (20) to which is attached a hopper (21) adapted to admit solid carbon particles to the apparatus. Section (19) is closed by flange piece (22) which is penetrated by a poker (23) which may be employed to assist in the flow of the carbon particles from hopper (21) into sections (19) and (17) and tube (1).

The central section of tube (1) is surrounded by metal shell (24) with fire-brick lining (25), the shell being closed at both ends by metal plates (26) and (27). The shell (24) and its coordinate parts form a furnace in which the tube (1) freely revolves. Heat is supplied to the furnace by means of gas pipe (28) and a series of connected gas burners which are fixed along the side of the shell, the flame jets being directed against the tube (1) through ports in the shell. In the drawing, these gas burners and entrance ports are indicated by legends (29), (30), (31), and (32), the latter burner and corresponding port being shown in cross-section in Figure 2. Similar gas burners and ports extend along the entire length of the shell, and are shown in phantom on the cutaway section of Figure 1.

By means of these heating elements, the annular space between the tube (1) and the firebrick (25) is heated to the desired degree, the gaseous products of combustion being removed from the furnace through an exit port (33) on the opposite side of the shell as indicated in Figure 2.

The whole apparatus may be supported by conventional means as shown in the drawing, the stuffing box (8) being best supported by adjustable tie rods as indicated.

In the operation of the process, granular carbon—such, for example, as charcoal or coke—is admitted to the apparatus through the hopper (21). The carbon travels downward by gravity through sections (19), (17), and (15) into the upper end of the tilted tube (1). The rotation of the tube agitates the carbon and causes it to pass downward until the tube is filled. In case the carbon in the upper sections tends to bridge over, the "bridges" may be broken up by means of the "poker" (23). The carbon in the tube (1) shows no tendency to stick or bridge, on account of the motion of the tube.

The fire-brick-lined metal shell (24) comprises a furnace in which the tube (1) is heated. This is accomplished by heating the annular space between (1) and (25) by means of the gas jets (29), (30), etc., the products of combustion leaving the furnace through port (33). When the temperature of the furnace has been raised to 1000–1100° C., carbon dioxide is admitted to the apparatus through the pipe (12). This gas rises up through the tube where it reacts with the hot carbon to form carbon monoxide, and then leaves the apparatus through exit port (18). The process may be continued indefinitely. As rapidly as the carbon is consumed in the reaction, more enters the tube from hopper (21). At intervals, the operation may be stopped, and the ashes may be removed by disconnecting the stuffing box (8).

In the operation of this process it is important that the tube (1) be kept full of carbon at all times so that a maximum of contact with the carbon dioxide is assured. In the case of nut-sized carbon, if the flow of carbon dioxide is adjusted to allow ten seconds contact with the heated carbon, the effluent gas will contain 85–90% carbon monoxide. Aside from a trace of nitrogen, due to air leaks and to the nitrogen contained in charcoal or coke, the remaining ten per cent of gas will be found to consist entirely of carbon dioxide. The proper rate of gas flow to permit ten seconds contact depends on the size and proportioning of the specific apparatus employed, but the adjustment of the rate may be accomplished without difficulty. The free volume (voids) of the tube (1), when it is filled with carbon, may be easily calculated, and the volume of effluent gas per second may be measured. The rate of input of carbon dioxide may then be adjusted to the point at which the volume of gas evolved every ten seconds is equal to the free volume of the tube. In the case of pea-sized carbon, the time of contact may be halved.

If carbon monoxide of extremely high purity is required, the gas evolved from exit port (18) may be washed with water to remove soot, and may be scrubbed with a caustic solution to remove any traces of carbon dioxide.

By means of the process and apparatus thus described it is possible to produce a carbon monoxide gas of greater purity than is otherwise obtainable by economical means. The fact that the process does not depend on an alternate cycle of "blows" and generation periods, as does the water gas process, is of great practical importance. The rotation of the tube assures an even degree of heating throughout the carbon contained in it, allows accurate temperature control, and prevents channeling of carbon which would cause a lowering of yield. The rotation of the tube also provides a positive feed of carbon into the apparatus.

Many changes might be made in the construction of the apparatus without departing from the spirit of my invention. For example, provision might be made for the automatic disposal of ashes from the apparatus through a suitably designed grate. A screw conveyor might be employed to provide a positive feed of carbon particles into the tube, or similar automatic stoking devices might be used. Since the process merely requires the agitation of carbon granules within a heated vessel, this might be accomplished as well in a fixed (non-rotating) tube, for the carbon particles might be agitated within the tube by means of a screw conveyor or some similar device.

Other changes might be made in the present apparatus that would introduce considerable economies in large-scale operation. For example, powdered coal or crude oil might be used as fuel, in place of gas, and the waste heat from the furnace might be used for power or steam production. In the appended claims, the term "granule" is not used in a limiting sense, but applies generally to lumps or particles of any convenient size.

Now having fully described my invention, I claim the following as new and novel:—

1. A process for the production of carbon monoxide which comprises passing carbon dioxide through nut-sized carbon granules at a rate of approximately ten seconds gas contact, while maintaining said granules in a state of agitation at 800–1500° C.

2. A process for the production of carbon monoxide which comprises passing carbon dioxide through nut-sized carbon granules at a rate of approximately ten seconds gas contact, while maintaining said granules in a state of agitation at 1000–1100° C.

3. A process for the production of carbon monoxide which comprises passing carbon dioxide through a column of carbon granules at 1000–1100° C., said column being revolved so as to keep the said carbon granules in a state of agitation, the rate of gas flow being adjusted to allow about ten seconds gas contact in the case of nut-sized granules, and proportionately in other cases.

4. A process for the production of carbon monoxide which comprises passing carbon dioxide through carbon granules at 800–1500° C. while maintaining said granules in a state of agitation and adjusting the rate of gas flow to allow about 10 seconds gas contact in the case of nut-sized granules and proportionately in other cases.

5. A process for the production of carbon monoxide which comprises passing carbon dioxide through carbon granules at 1000–1100° C. while maintaining said granules in a state of agitation and adjusting the rate of gas flow to allow about 10 seconds gas contact in the case of nut-sized granules and proportionately in other cases.

In testimony whereof I affix my signature.

JOHN C. WOODRUFF.